United States Patent Office 3,360,540
Patented Dec. 26, 1967

3,360,540
PROCESS FOR THE MANUFACTURE OF CYANOACETIC ACID ESTERS
Kurt Sennewald and Alfred Hauser, Knapsack, near Cologne, and Winfried Lork, Friesheim, near Euskirchen, Germany, assignors to Knapsack Aktiengesellschaft, Knapsack, near Cologne, Germany, a corporation of Germany
No Drawing. Filed Apr. 12, 1965, Ser. No. 447,524
Claims priority, application Germany, May 8, 1964,
K 52,894
8 Claims. (Cl. 260—464)

ABSTRACT OF THE DISCLOSURE

A process producing cyanoacetic acid esters by reaction of the corresponding halogenoacetic acid ester with HCN in presence of an alkali metal alcoholate at indicated temperature and pressure.

---

The present invention provides a process for the manufacture of cyanoacetic acid esters of the formula

CN—$CH_2$—COOR in which R stands for an aliphatic, cycloaliphatic or aralkyl radical, by reacting corresponding halogenoacetic acid hydrocarbyl esters with hydrogen cyanide.

Cyanoacetic acid esters, which are used as feed material for numerous syntheses in the pharmaceutical and plastics fields, have been prepared heretofore, e.g. by reacting the sodium salt of chloroacetic acid with an alkali metal cyanide in an aqueous solution, the resulting cyanoacetic acid being isolated from the aqueous phase and thereafter esterified with an alcohol. If isolating the cyanoacetic acid, e.g. by evaporation of the aqueous solution or by extraction with a suitable extractant, is deemed to constitute a separate process step, this conventional technique must be termed a three-stage process, wherein more especially the second and third process steps incur losses of yield due to hydrolysis of the cyanoacetic acid or due to incomplete extraction of the aqueous phase or due to incomplete esterification of the acid, which means that the cyanoacetic acid ester will be obtained in a yield as low as 70 to 80%.

A further process for making cyanoacetic acid alkyl esters has been disclosed in German Patent No. 640,509 which teaches allowing chloroacetic acid alkyl esters to act upon an alkali metal cyanide at an elevated temperature in the presence of a free organic acid. In this process, the reaction time is as long as 24 hours which substantially favors the formation of by-products, e.g. cyano-succinic acid esters or β-cyano-tricarballyl esters so that the average yield of cyanoacetic acid esters will be as low as 70%.

Still further, cyanoacetic acid esters can be produced by the method disclosed in U.S. Patent No. 2,985,682 wherein a halogenoacetic acid ester is caused to react with hydrogen cyanide and ammonia in an inert solvent. The relatively long reaction period of about 7 hours is unsatisfactory in this process which promotes by-product formation as the process of German Patent No. 640,509. Only very accurate maintenance of the reaction conditions, especially maintenance of a reaction temperature of 0° C., permits obtaining good yields of cyanoacetic acid esters as working at a temperature of 2–6° C. already results in the obligatory formation of chloroacetamide or glycinamide as by-products. In addition thereto, it is a rather complicated procedure to remove ammonium chloride which is obtained as a by-product and is dissolved in the reaction product, e.g. by treating the solution with water, as this may entrain partial hydrolysis of the ester.

The present invention now provides a process for the manufacture of cyanoacetic acid esters in good yields within a reaction period substantially shorter than in conventional processes with only a very minor formation of by-products which can be split into hydrocyanic acid and cyanoacetic acid esters, the said shorter reaction period permitting carrying out the present process in continuous manner, if desired. The process of the present invention permits producing without any difficulty cyanoacetic acid esters of the general formula:

CN—$CH_2$—COOR in which R stands for an optionally substituted alkyl, cycloalkyl or aralkyl radical, wherein a halogenoacetic acid ester of the formula Hal-$CH_2$—COOR, in which R has the meaning given above, is caused to react with a stoichiometric excess of hydrogen cyanide in the presence of an alkali metal alcoholate and optionally in the presence of an inert solvent, at a temperature within the range of about 20 to 250° C. and under pressure of about 1 to 6 atmospheres, the reaction is completed, precipitated alkali metal halide is separated, and remaining solution is distilled to yield cyanoacetic acid ester.

Despite the relatively short reaction time of at most about 1 hour, the cyanoacetic acid ester is obtained in the present process in yields averaging 80% of the theoretical with the semi-nitrile of the α-iminosuccinic acid ester being obtained as the sole by-product in a concentration of less than 1% by weight, related to the amount of cyanoacetic acid esters obtained. This is a very unexpected result since alkoxy acetic acid esters as a product formed by reaction of halogenoacetic acid esters with alkali metal alcoholates would have been expected to form (cf. U.S. Patent No. 2,452,350) but formation thereof is obviously suppressed in favor of cyanoacetic acid ester formation.

The feed materials suitable for use in carrying out the process of the present invention include chloro, bromo or iodoacetic acid esters whose alcoholic component preferably has up to 6 carbon atoms and may carry an alkoxy, halogeno, cyano, nitro or amino-group or a similar group as substituent.

The presence of an alkali metal alcoholate which serves as a condensing agent substantially promotes the reaction of the above halogenoacetic acid esters with a stoichiometric excess of hydrogen cyanide. It is especially advantageous to use, per mole alkali metal alcoholate, 1.1 to about 4 mols halogenoacetic acid ester and about 1.5 to 6 mols hydrogen cyanide. The alkali metal alcoholates preferably are products obtained by reacting sodium or potassium e.g. with an alcohol corresponding to the alcoholic component of the halogenoacetic acid ester. As the reaction is carried out in a slightly alkaline medium at a pH-value of 8–9 which hardly involves any risk of an interchange of ester radicals taking place, there may also be used an alkali metal alcoholate having an alcoholic component other than the halogenoacetic acid ester. The alkali metal alcoholate can be used in solid form or in an alcoholic solution and introduced in such form into the feed mixture. The alkali metal alcoholates generally used are preferably sodium or potassium methylate or the corresponding ethylates.

An exemplary mode of executing the process of the present invention comprises gradually admixing at atmospheric pressure a mixture of a halogenoacetic acid ester and an excess of hydrocyanic acid heated to boiling temperature with an alcoholic solution of the alkali metal alcoholate. Since too rapid addition of the alcoholate to the feed mixture results in a decreased cyanoacetic acid ester yield, the alcoholate is conveniently added at a feed rate warranting a reaction time not exceeding about 1 hour. It is also possible to separately introduce the reactants into the reaction vessel, but care should be taken to ensure permanent presence of hydrocyanic acid in a molar excess over the alkali metal alcoholate and the halogenoacetic acid ester. The resulting reaction product, i.e. an alkali metal halide, precipitates in finely divided form from the reaction solution and can be separated by centrifugation or filtration after the reaction mixture has been cooled. The remaining reaction solution is successively distilled so as to recover cyanoacetic acid ester, the recovered solvent being used again for making alcoholate. Unreacted halogeno-acetic acid esters and hydrogen cyanide can be re-used in analogous manner.

The cyanoacetic acid esters produced as described above are rendered slightly turbid due to minor contamination (less than 1% by weight) with the semi-nitrile of the α-imino-succinic acid ester obtained concurrently as a by-product. Such turbidity can be suppressed by admixing the reaction mixture before the distillative work-up with about 0.1 to 1% by weight of tertiary base boiling at a temperature higher than the cyanoacetic acid ester and splitting the semi-nitrile quantitatively into cyanoacetic acid ester and hydrogen cyanide. Suitable tertiary bases are e.g. triethanolamine, triphenylamine or quinoline. The splitting takes place at about 100° C.

The process of the present invention distinguishes over conventional methods by simpler execution in a single process stage and shorter reaction periods yielding more than 80% of desired reaction product, related to the theoretical yield.

EXAMPLE 1

A boiling solution of 54.3 grams (0.5 mol) chloroacetic acid methylester and 13.5 grams (0.5 mol) hydrocyanic acid was admixed, while stirring, within 220 minutes, with 4,320 grams of a 25% sodium methylate solution (20 mols) in methanol and with a mixture of 3,255 grams (30 mols) chloroacetic acid methylester and 1,080 grams (40 mols) hydrocyanic acid to ensure permanent presence of the chloroester and hydrocyanic acid in an excess proportion over sodium methylate. Finely crystalline sodium chloride precipitated at once. When the addition of the feed products had been completed, the whole was boiled for a further 30 minutes under reflux, the reaction mixture was allowed to cool at 0° C., and the sodium chloride was separated from the liquid phase by filtration. The NaCl-free solution was subjected to fractional distillation, the methanol and unreacted hydrocyanic acid were driven off, and 1,098 grams (10.12 mols) unchanged chloroacetic acid methylester were obtained as the first runnings. Cyanoacetic acid methylester was successively distilled while adding 2 grams triethanolamine to obtain 1,709 grams (17.25 mols) pure cyanoacetic acid methylester (B.P.$_{10}$: 86° C.). This corresponded to a yield of 86.2% of the theoretical, related to the methylate feed, or to a yield of 84.6%, related to the chloroacetic acid methylester which underwent conversion.

EXAMPLE 2

A boiling solution of 54.3 grams (0.5 mol) chloroacetic acid methylester, 270 grams (10 mols) hydrocyanic acid and 80 cc. methanol was admixed dropwise, while stirring, within 175 minutes, with 759 grams (7 mols) chloroacetic acid methylester and with 1,122 grams of a methanolic 24.1% sodium methylate solution (5 mols). After the admixture had been terminated, the reaction mixture was boiled for 15 minutes under reflux, then cooled at 0° C., and precipitated sodium chloride was separated. The reaction solution was distilled, methanol and unreacted hydrocyanic acid were separated, and 274 grams (2.5 mols) unreacted chloroacetic acid methylester were recovered. Cyanoacetic acid methylester (B.P.$_{20}$: 99° C.) was obtained in a yield of 406 grams (4.1 mols), corresponding to 82.0% of the theoretical, related to feed methylate, or corresponding to 82.3%, related to the chloroacetic acid methylester which underwent conversion. Subjecting the cyanoacetic acid methylester to filtration and recystallization of the residue from methanol resulted in the formation of about 1 gram α-imino-succinic acid methylester melting at 159 to 161° C., which was obtained as a by-product.

EXAMPLES 3 TO 6

The examples compiled in the following table indicate the influence of the hydrocyanic acid excess on the yield of cyanoacetic acid methylester and on the reaction velocity. In Examples 3 to 6, a mixture of chloroacetic acid methylester and hydrocyanic acid in a determined molar ratio was heated to boiling and a determined proportion of a methanolic sodium methylate solution was added with agitation. The total reaction time comprises the time for feeding the methylate plus the time required for boiling under reflux. The reaction mixture was worked up in the manner set forth in Example 1.

TABLE

| Ex. | Molar ratio NaOCH$_3$:HCN: Cl·CH$_2$·COOCH$_3$ | Time for feeding methylate (min.) | Total reaction time (min.) | Percent yield of cyanoacetic ester | |
|---|---|---|---|---|---|
| | | | | Related to feed methylate | Related to chloro-ester transformed |
| 3 | 1:1.1:1.1 | 3 | 30 | 69.2 | 70.2 |
| 4 | 1:1.5:1.5 | 25 | 35 | 85.9 | 80.4 |
| 5 | 1:2.0:1.5 | 35 | 40 | 82.0 | 82.3 |
| 6 | 1:6.0:3.0 | 45 | 60 | 88.5 | 84.2 |

EXAMPLE 7

306.4 grams (2.5 mols) chloroacetic acid ethylester, 270 grams (10 mols) hydrocyanic acid and 100 cc. ethanol were heated to boiling with agitation and the resulting solution was admixed, within 110 minutes, with 612.7 grams (5.0 mols) chloroacetic acid ethylester and 1,836 grams of a 18.5% sodium ethylate solution in ethanol (5.0 mols). Boiling was continued for a further 25 minutes with reflux, the reaction solution was cooled at 0° C., and precipitated sodium chloride was filtered off. 346 grams (2.8 mols) chloroacetic acid ethylester were recovered in addition to ethanol and unreacted hydrocyanic acid by fractional distillation of the reaction solution. Vacuum distillation of the crude cyanoacetic acid ethylester at 105° C. under a pressure of 10 mm. mercury while adding 0.5 gram triethanolamine gave 452 grams (4.0 mols) cyanoacetic acid ethylester. This corresponded to a yield of 80% of the theoretical, related to the feed ethylate, or to 85.5% of the theoretical, related to the chloroacetic acid ethylester which underwent conversion.

EXAMPLE 8

A boiling solution of 162 grams (6 mols) hydrocyanic acid and 530 grams (3 mols) chloroacetic acid cyclohexylester was admixed dropwise, within 35 minutes, with 450 grams of a 24% sodium methylate solution in methanol (2 mols). The whole was heated for a further 25 minutes under reflux, then cooled at 0° C., precipitated sodium chloride was separated from the reaction mixture, and the filtrate was subjected to fractional distillation, 159.6 grams (0.9 mol) chloroacetic acid methylester were recovered in addition to methanol, a small amount of cyclohexanol and unreacted hydrocyanic acid. The cyanoacetic acid cyclohexylester (B.P.$_1$: 97–98° C.) was obtained in a yield of 216.5 grams (1.3 mols), corresponding to 65% of the theoretical yield, related to the methylate feed, or corresponding to 61.9% of the theoretical yield, related to the chloroacetic acid cyclohexylester which underwent conversion.

We claim:
1. A process for the manufacture of cyanoacetic acid esters of the formula

$$CN-CH_2-COOR$$

which comprises reacting a halogenoacetic acid ester reactant of the formula $$Hal-CH_2-COOR$$

wherein R is defined as hydrocarbyl or substituted hydrocarbyl having as substituent a member selected from the group consisting of a halo, alkoxy, cyano, nitro or amino and Hal is a chloro, bromo or iodo atom with a stoichiometric excess of hydrogen cyanide in the presence of an alkali metal alcoholate; effecting the reaction at a temperature of about 20–250° C. and a pressure of about 1–6 atmospheres; and recovering the resulting reaction product.

2. The process of claim 1, wherein the reaction is carried out in the presence of an inert solvent.

3. The process of claim 1, utilizing an alkali metal alcoholate obtained by reacting sodium or potassium with an alcohol corresponding to the alcoholic component of the halogenoacetic acid ester reactant.

4. The process of claim 1 wherein 1.1–4 mols halogenoacetic acid ester and about 1.5–6 mols hydrogen cyanide are employed per mol of alkali metal alcoholate.

5. A process as claimed in claim 1 wherein the reaction is effected within 60 minutes.

6. The process of claim 1 wherein R is alkyl having up to 6 carbon atoms.

7. A process as claimed in claim 1 wherein semi-nitrile by-products are subsequently heated to a temperature of about 100° C. in the presence of about 0.01–1% by weight of a tertiary amine or quinoline base, said base having a boiling point higher than the resulting cyanoacetic acid ester product.

8. A process as claimed in claim 7 wherein the tertiary base is triethanolamine or triphenylamine.

References Cited

Scarborough, C. A., vol. 9, p. 2895 (1915).

JOSEPH P. BRUST, *Primary Examiner.*

UNITED STATES PATENT OFFICE
CERTIFICATE OF CORRECTION

Patent No. 3,360,540                          December 26, 1967

Kurt Sennewald et al.

It is certified that error appears in the above identified patent and that said Letters Patent are hereby corrected as shown below:

Column 3, line 19, "about 0.1 to 1%" should read -- about 0.01 to 1% --.

Signed and sealed this 23rd day of September 1969.

(SEAL)
Attest:

Edward M. Fletcher, Jr.                      WILLIAM E. SCHUYLER, JR.
Attesting Officer                              Commissioner of Patents